Oct. 3, 1933.    J. P. FREEMON    1,929,166
ELECTRIC GRILL
Filed May 3, 1930    2 Sheets-Sheet 2

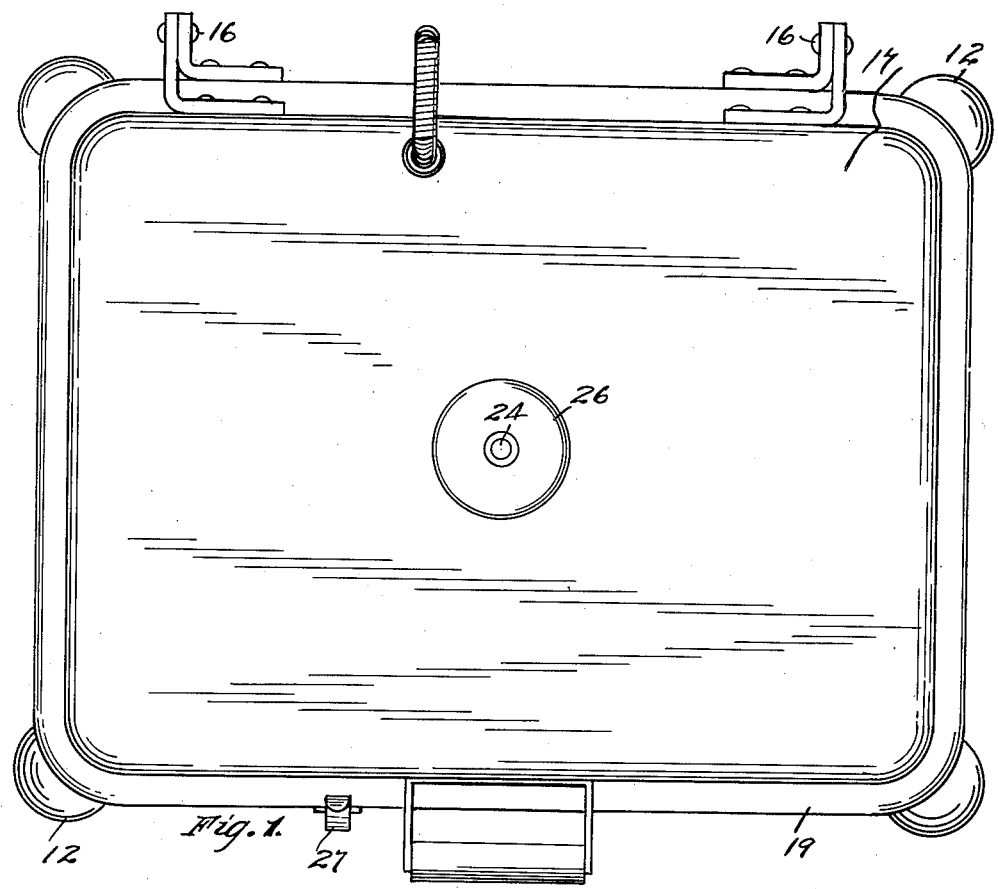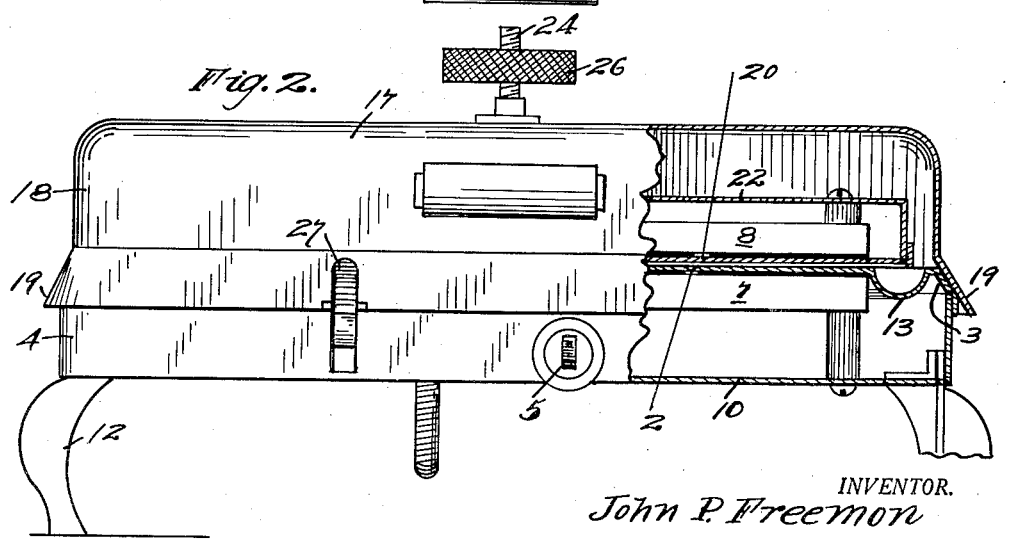

INVENTOR,
John P. Freemon;
BY
ATTORNEY.

Patented Oct. 3, 1933

1,929,166

UNITED STATES PATENT OFFICE 1,929,166

ELECTRIC GRILL

John P. Freemon, Los Angeles, Calif., assignor to Freemon Electric Company, Cleveland, Ohio, a corporation of Ohio Application May 3, 1930. Serial No. 449,541

2 Claims. (Cl. 53—5)

This invention relates to cooking apparatus, and more particularly to electric grills.

It is an object of this invention to provide a grill in which there is a practically sealed cooking chamber so as to exclude, to an advantageous degree, oxygen during cooking process so that the material being cooked may be subjected to a higher degree of temperature with less liability of burning than is possible where there is a free access of air to the heated material, and thus obtain a quick cook of the goods.

A further object is to provide for simultaneous cooking of the top and the bottom surfaces so as to seal in the juices, especially in the cooking of steaks and thus to retain, as far as possible, all of the volatile substances in the meat.

An additional object is to provide cooking elements which are relatively freely movable so that effective cooking contact of the hot planes of cooking elements may be automatically acquired irrespective of the irregularity of the general planes of steak, or other object, to be cooked.

Another object is to provide an electric grill in which is incorporated interchangeable heating plates; to provide protected plates so that they will not be readily soiled by the juices and vapors produced during cooking process, and in general to provide a simple, practicable, inexpensive and durable cooker of this class.

The invention consists of certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is plan of the grill.

Figure 2 is a front elevation, partly broken away.

Figure 3:
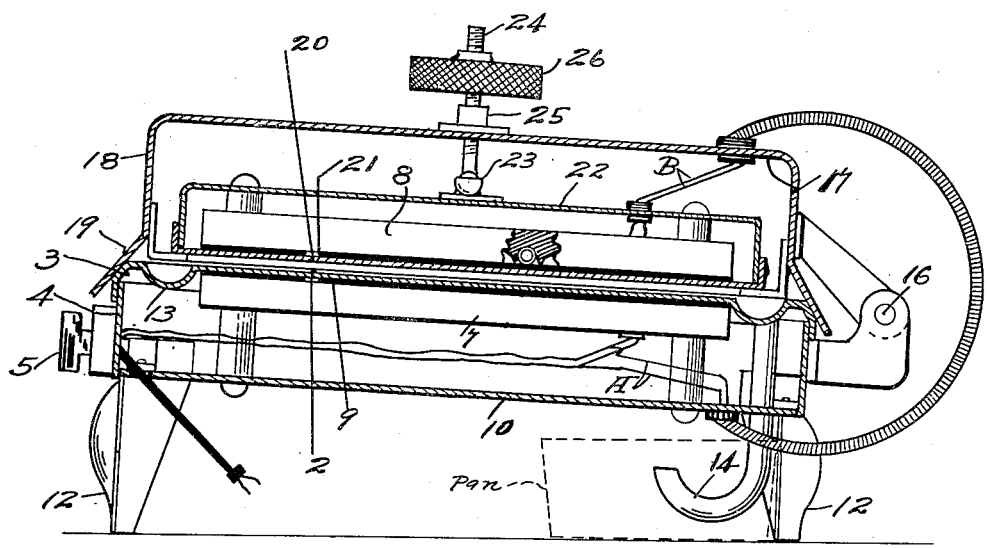
Figure 3 is a vertical section of the grill from front to rear.

The grill, as here shown, comprises a sectional shell including a stationary, but readily portable, bed plate 2, having a surrounding beveled marginal shoulder 3 on a shell band 4 the front wall of which is provided with a control switch 5 for parallel electric circuits A—B each including appropriate coil-grid elements 7 and 8.

The lower element 7 is secured up close to the lower face of the plate 2 and is insulated therefrom by a sheet of insulation 9 and is guarded by a false bottom sheet 10 secured to the shell band 4; this having attached legs 12 at the corners; the front legs being longer and thus inclining the plate 2 so that juices from the material, as a steak, being cooked on the plate 2, will drain down a gutter 13 to a rear drain tube 14. The lower end of this tube is upturned to form a slight trap to hold steam back in the cooker. It is found that by providing for quick cook, high temperature and low pressure a desired tenderness of the meat is obtained.

To this lower shell structure is hinged, at 16, a top shell structure including a cover 17 having a rim 18 with an outwardly flared flange 19 complementary to and closely seating on the shoulder 3 so as to practically exclude entrance of air into the cooking chamber under the lowered, cover section. Within the cover 17 is a floating or universally movable top hot plate 20 to the back of which is secured the upper heating element 8; a sheet 21 of insulation being interposed. The unit 8 is enclosed in a box 22 which is connected by a universal joint 23 to a freely sliding screw 24 mounted in a sleeve 25 at the center of the cover 17. On the screw 24 is a nut 26 adjustment of which determines the height of suspension of the tilting plate 20; varied according to the thickness of the body to be cooked.

In operation, the cover section 17 is lifted (carrying the plate 20) and the steak, or other material to be cooked, is placed on the hot plate 2. The cover is then lowered and the plate 20 tips down onto the steak and assumes a conforming top angle. The pressure of the top plate is regulated by the adjusting nut 26, which suspends the plate. When the cover section is closed the flange 19 seats snugly on the shoulder 3 of the base section and thus excludes admission of oxygen from the air and prevents burning of the body, which, therefore, may be quickly cooked at high temperature. A quick cooking process conserves the volatile matter in the meat.

A latch or retainer 27 may be employed to secure the cover down, and thus cause generation of low steam pressure in the grill.

The grid elements 7—8 are duplicate, and readily interchanged or renewed.

What is claimed is:

1. An electric grill including a hot bed plate, and an upper hot plate having a backing heater element and a back box encasing said element, a stem oscillatively connected to the box and providing for its universal movement, and a cover shell for the bed plate and in which said stem is slidably mounted.

2. An electric grill including a hot bed plate, and an upper hot plate, a threaded stem pivotally connected for universal action to and for raising and lowering the upper plate as to the bed plate, and a shell in which the upper plate is movably housed and having a bearing in which the stem is freely slidable; said stem having a nut to limit its inward sliding action in the shell.

JOHN P. FREEMON.